(No Model.) 2 Sheets—Sheet 1.
C. A. JACKSON.
ELECTRIC MOTOR.
No. 301,602. Patented July 8, 1884.
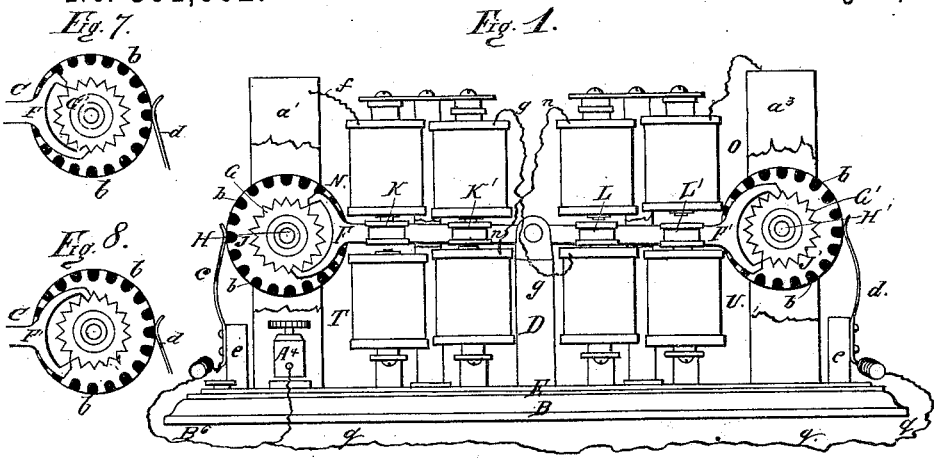
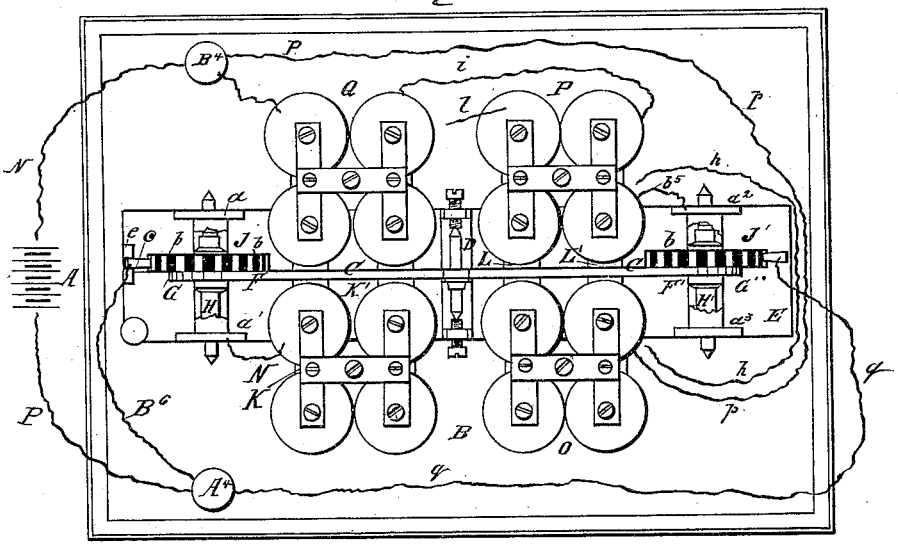
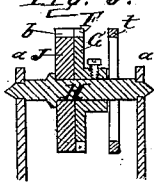
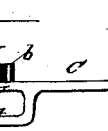
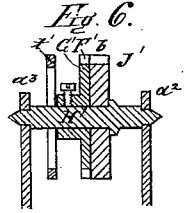
Witnesses.
Thos. J. Bailey
A. F. Hayden.
Inventor
Charles A. Jackson.
F. Curtis — Atty.

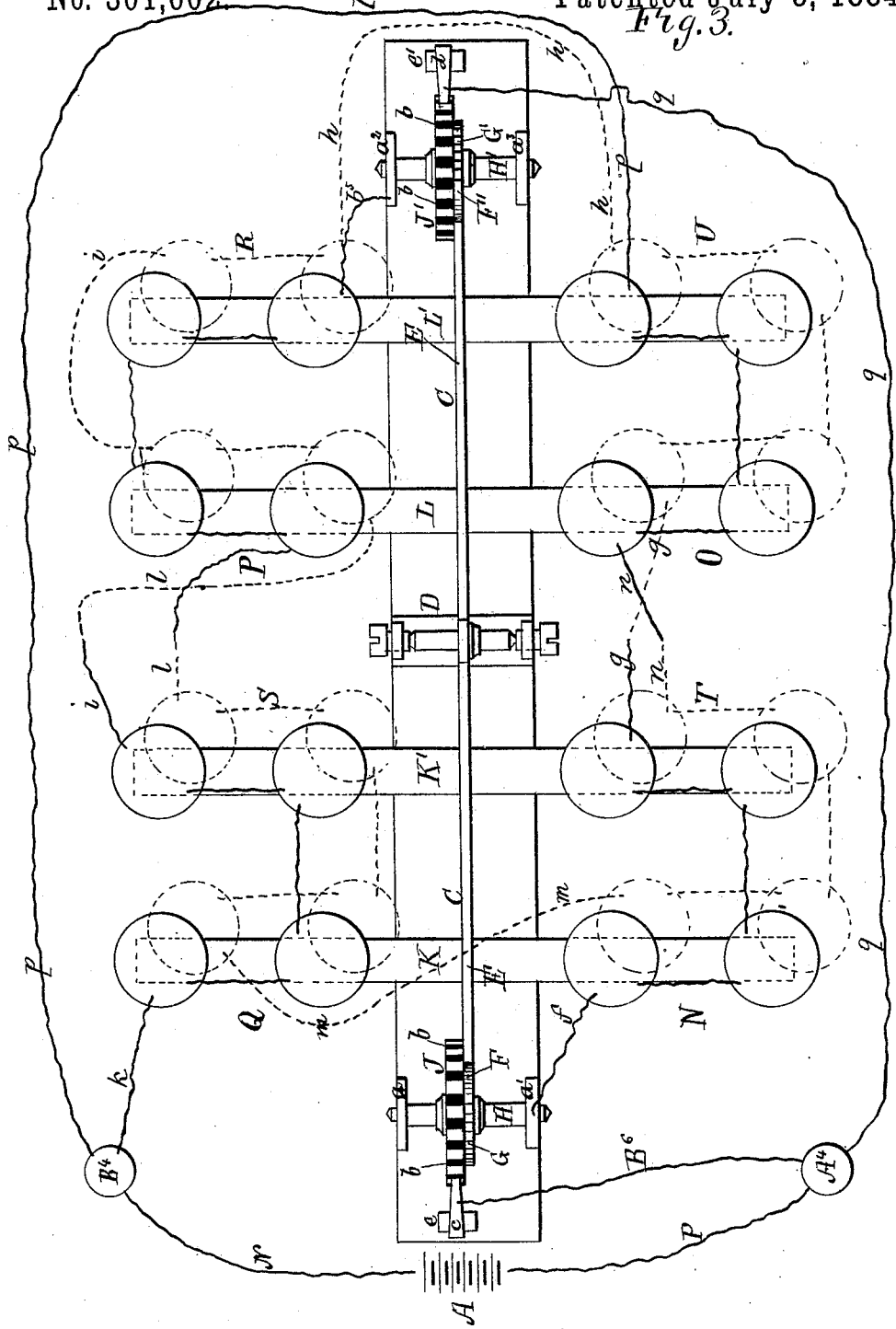

UNITED STATES PATENT OFFICE.

CHARLES ALMON JACKSON, OF LAWRENCE, MASSACHUSETTS.

ELECTRIC MOTOR.

SPECIFICATION forming part of Letters Patent No. 301,602, dated July 8, 1884.

Application filed November 15, 1883. (No model.)

*To all whom it may concern:*

Be it known that I, CHARLES ALMON JACKSON, a citizen of the United States, residing at Lawrence, in the county of Essex and State of Massachusetts, have invented certain new and useful Improvements in Electric Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates to electro-magnetic motors of a class in which the lever of an electric armature escapement vibrating between two pairs of electro-magnets alternately polarized and depolarized from the same battery by a suitable circuit-breaker puts in motion the scape-wheel of said escapement.

My invention is a continuation or enlargement of the principle of a motor for which I filed an application for a patent on the 6th day of September, 1883, which application has been allowed. In my present motor I employ a dual escapement—that is, a lever having an escapement upon each end, with armatures disposed between such escapements, each end of the lever or the armatures thereof vibrating between two electro-magnets or clusters of magnets, the diagonally-opposite (in a vertical line) pairs of these magnets operating one pair to offer attraction to diagonally-opposite sides of ends of the lever, while the other two pairs or clusters are depolarized or out of circuit, and vice versa, when the polarity of the magnet is changed by a suitable circuit-breaker.

The drawings accompanying this specification represent in Figure 1 a side elevation, and in Fig. 2 a plan, of a motor containing my improvements. Fig. 3 is a diagram showing in plan the general arrangement of the parts of the motor. Fig. 4 is a plan, Figs. 5 and 6 sections, and Figs. 7 and 8 side views of a modified construction of the escapements.

In said drawings, A represents an electric battery, and N P its two poles.

B represents a tablet for supporting the operative parts of the motor.

C represents a horizontal vibratory lever, pivoted at its center to the top of a conducting metal post, D, erected upon a metal plate, E, secured to the top of the tablet B. Each end of the lever C terminates in an anchor-escapement, F or F', which operates a scape-wheel, G or G', of conducting metal, carried by a horizontal shaft, H or H', journaled in bearings in upright standards $a\ a'\ a^2\ a^3$, erected upon the plate E.

Secured axially to each shaft H H' and alongside each scape-wheel is a circular disk, J or J', each disk constituting a circuit-breaker or commutator, and having a series of insulated blocks, $b\ b$, &c., let into its periphery at regular and frequent intervals, each disk operating with a spring connected with the battery A, as hereinafter explained. The spring of the disk J is shown at $c$, and that of the opposite disk, J', at $d$, each spring being of conducting metal and secured at its base to a post, $e$ or $e'$, of insulating material erected upon said plate, in order to insulate the springs from the latter. The free end of one spring—for instance, $c$—bears upon the periphery of the conducting-disk J, while the free end of the spring $d$ bears upon an insulator, $b$, of the opposite disk, these relative positions being reversed when the lever C vibrates and advances each scape-wheel and commutator one tooth. Two screw-posts or pole-cups, $A^4\ B^4$, are erected upon the tablet B. The post $A^4$ connects with the positive pole of the battery and with the spring $c$ by a wire, $B^6$, and also with the spring $d$ by a wire, $q$. Each end of the escapement-lever C carries a pair of horizontal parallel armatures, K K' L L', each pair of which vibrate between four clusters of electro-magnets arranged upon opposite sides (above and below) of the said lever. The object in combining a number of magnets is to multiply the power.

As shown in the accompanying drawings, each cluster of magnets is composed of four; but this number may be varied to any extent, according to the amount of power required in any given instance. As each cluster of magnets operates practically as one magnet, I shall, for clearness of explanation, refer to them as single magnets.

As the plan in Fig. 3 is intended to be a general diagram illustrative of my system, I have shown the four upper magnets and their connecting-wires in solid or unbroken black lines, and the four lower magnets and their wires in dotted lines, the said lower magnets being placed slightly to one side of the upper ones for clearness of description, though in reality they are directly beneath them, as shown in Fig. 1. The four upper magnets are shown, respectively, at N O P Q, and the lower ones at R S T U.

The connections of the various parts, as shown particularly in the diagram, Fig. 1 of the drawings, is as follows: The post $A^4$ connects with the spring $c$ by a wire, $B^6$, and with the opposite spring, $d$, by a wire, $q$. The standard $a'$ (and hence the plate E and its conducting-connections) connects with the magnet N (upper on left) by a wire, $f$. The magnet N connects with the magnet U (lower on opposite end, but same side of lever C) by another wire, $g$. The magnet U connects by another wire, $h$, with the magnet R, (lower on same end, but opposite side of lever C.) The magnet R connects by another wire, $i$, with the magnet Q, (upper on opposite end, but same side of lever C,) and the magnet Q connects by another wire, $k$, with the screw-post $B^4$ and battery-pole N. The standard $a^2$ (and hence the plate E, &c.) connects by a wire, $b^5$, with the magnet P, (upper on right.) The magnet P connects by a wire, $l$, with the magnet S, (lower on opposite end, but same side of lever C.) The magnet S connects by another wire, $m$, with the magnet T, (lower on same end, but opposite side of lever C.) The magnet T connects by another wire, $n$, with the magnet O, (upper on opposite end, but same side of lever C,) and the magnet O connects by another wire, $p$, with the binding-post $B^4$, before named, and the pole N of the battery. One circuit is as follows: From post $A^4$ by wire $B^6$ to spring $c$, from spring $c$ to disk J, (these two being in electric connection,) and from disk J to its shaft H, and thence to standard $a'$, from standard $a'$ to magnet N by wire $f$, from magnet N by wire $g$ to magnet U, from magnet U by wire $h$ to magnet R, from magnet R by wire $i$ to magnet Q, from magnet Q by wire $k$ to screw-post $B^4$ and battery-pole N. The other circuit is as follows: From magnet P (upper on right) by wire $l$ to magnet S, (lower on opposite end of lever,) from magnet S by wire $m$ to magnet T, (lower on opposite side of lever,) from magnet T by wire $n$ to magnet O, (upper on opposite end of lever,) from magnet O by wire $p$ to post $B^4$ and battery-pole N. The connection between the battery and magnet P is by pole-wire N to post $B^4$; thence by wire to magnet Q, as shown in Fig. 2, and thence by wire to magnet P, thus completing the circuit.

The operation of the above-described device, as shown particularly in the diagram Fig. 3, is as follows, supposing (as shown in said diagram) the spring $c$ to be in contact with the periphery of the commutator J, and the spring $d$ in contact with one of the interdentil insulators $b$ of the opposite commutator J', the circuit in the first instance being closed through the magnets N, U, R, and Q, and broken through the magnets S, T, O, and P: The battery being let on, the magnets N and Q attract and lift the armatures K K', while the diagonally-opposite (vertically) magnets, U R, attract and pull down the opposite armatures, L L', thereby vibrating the lever C in one direction and advancing the scape-wheels G G' (by means of the armatures F F') one tooth. This reverses the positions of the commutators J J' with respect to the springs $c$ $d$, the spring $c$ now bearing upon an insulator, $b$, of the commutator J, and cutting out of circuit the magnets N U R Q, while the spring $d$ bears upon the commutator J' and closes the circuit through the magnets S T O P. The magnets O and P now attract and lift the armatures L L', and the diagonally-opposite (vertically) magnets S T attract and pull down the opposite armatures, K K', thereby vibrating the lever C in the opposite direction from at first, and again advancing the scape-wheels and commutators one tooth, and again reversing the relative positions of the springs and commutators and the polarity of the two pairs of magnets, and these motions and the advance of the scape-wheels and commutators and their shafts become continuous so long as the battery is on.

In order to be able to reverse the direction of motion of the motor, I employ two additional escapements, $t'$ $t'$, secured to or formed upon the ends of the lever C, one upon each side of the escapements F F', as shown in Figs. 4 and 5 of the drawings, and at a little distance from the latter, and I secure the scape-wheels to the shafts adjustably, in order to set them to operate with one or the other of the escapements, as the case may be. The escapements $t'$ $t'$ are arranged to operate in opposite directions from the escapements F F'— that is, to rotate the scape-wheels in opposite directions. The relative positions of the two pairs of escapements are shown in Figs. 7 and 8 of the drawings.

The power of my motor may be increased to any desired extent by simply multiplying the number of the magnets and increasing the length of the armatures, or in duplicating the entire device shown and explained herein, suitable battery-power being employed.

I claim—

1. In an electro-magnetic motor of a class in which the lever of an electric armature escapement vibrating between two pairs of electro-magnets alternately polarized and depolarized from the same battery by a suitable circuit-changer puts in motion the scape-wheel of said escapement, an escapement-lever carrying an armature and anchor-escapement upon each end, and the combination, with such escapements and armatures, of two pairs of electro-magnets, the armature upon each end of the lever being actuated by diagonally-opposite (vertically) pairs of said magnets, substantially as explained.

2. In combination, the four pairs (or their multiples) of magnets, arranged and connected as herein described, with the escapement-lever and scape-wheels and commutators, the magnets operating in diagonally-opposite pairs to attract the lever, their magnetization and demagnetization being governed by suitable commutators carried by the shafts of the scape-wheels.

3. The combination, with the four pairs of magnets, operating as explained, and the dual escapement-lever and commutators, and the scape-wheels, of additional or auxiliary escapements, by which the direction of motion of the motor may be changed, substantially as explained.

In testimony whereof I affix my signature in presence of two witnesses.

CHARLES ALMON JACKSON.

Witnesses:
F. CURTIS,
A. F. HAYDEN.